P. DU FORD.
SHOCK ABSORBER.
APPLICATION FILED MAY 20, 1919.
1,378,665.
Patented May 17, 1921.
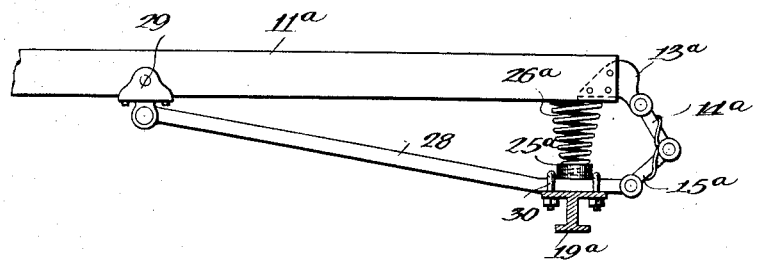
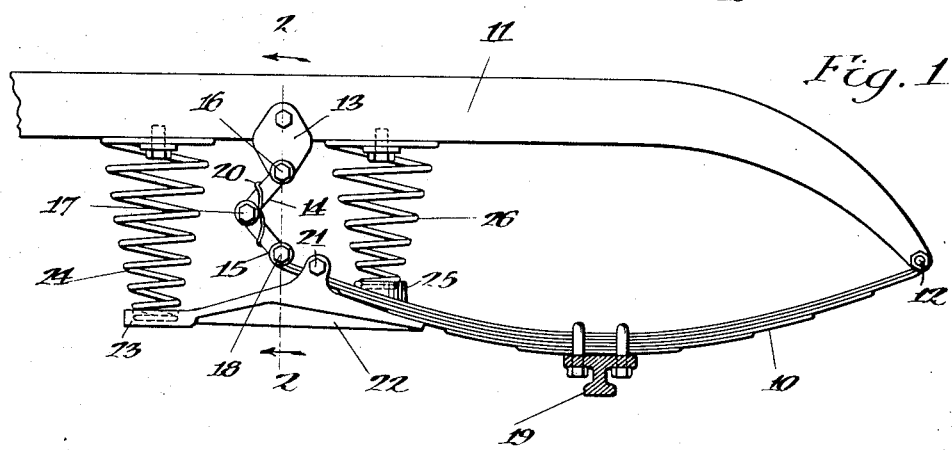
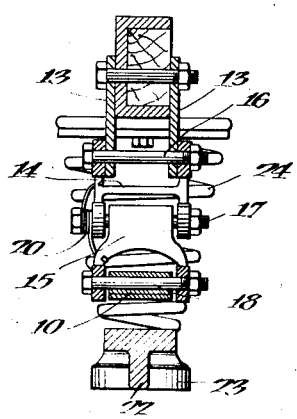
WITNESSES
Peter Du Ford,
INVENTOR.
BY
ATTORNEYS

UNITED STATES PATENT OFFICE.

PETER DU FORD, OF ONTARIO, OREGON.

SHOCK-ABSORBER.

1,378,665.  Specification of Letters Patent.  Patented May 17, 1921.

Application filed May 20, 1919. Serial No. 298,449.

*To all whom it may concern:*

Be it known that I, PETER DU FORD, a citizen of the United States, and a resident of Ontario, in the county of Malheur and State of Oregon, have invented certain new and useful Improvements in Shock-Absorbers, of which the following is a specification.

My present invention relates generally to the spring support of vehicles particularly self-propelled vehicles, and my object is the provision of shock absorbing means for use in connection with or without the ordinary leaf spring, either semi-elliptic or full elliptic, whereby to increase the range of relative movement of the spring controlled parts, and more completely absorb the shock of movement through the augmented range, without curtailing or impairing the normal function and operation of the leaf spring where present.

It is a well-known fact that in order to carry the weight of a vehicle body and allow for considerable variation in load the usual leaf springs must be made so heavy as to preclude the desired elasticity.

My invention will automatically take care of the variation in load and supply the desired elasticity by the use of a volute spiral compression spring used in connection with a device on a vehicle using the flat leaf springs running fore and aft with the vehicle and may be used without interfering with the leaf spring. When applied to a vehicle not having the ordinary leaf spring, a rigid bar is utilized, one end of the bar being pivoted to the frame of the vehicle, and the other end of the bar being arranged for the volute spiral compression spring after the manner of use with the ordinary flat leaf spring as hereinafter described.

In the accompanying drawing, illustrating my invention and forming a part of the specification, Figure 1 is a side view applied with the ordinary leaf spring;

Fig. 2 is a cross section taken on line 2—2 of Fig. 1; and

Fig. 3 is a side view illustrating the adaptation of the invention where the ordinary leaf spring is not available.

Referring now to Figs. 2 and 3, the usual leaf spring is indicated at 10, connected at one end to the side bar 11 of the vehicle at 12. In the illustration the leaf spring appears as of semi-elliptic form, but it should be understood that it may be a full elliptic spring and in this latter case the other section will bear the same relation as the frame bar 11 of the present showing.

The opposite end of the leaf spring is connected in spaced relation to plates 13 rigid with, and depending from, the frame bar 11, through toggle levers 14 and 15, the former of which is substantially H-shaped as seen in Fig. 2 and is respectively pivoted at its upper and lower ends by bolts 16 and 17, to the plates 13 and the lever 15. The lower lever 15 is U-shaped and is pivoted at its lower end by a bolt 18 to the leaf spring 10, the latter of which is intermediately, seated on and secured to, the axle 19, as usual.

Around the pivot bolt 17 between the levers 14 and 15 is coiled a spring 20 whose ends are extended vertically and provided with hooks engaging the levers 14 and 15 intermediate their ends.

Adjacent to its end bolt 18, the leaf spring 10 is engaged by the cross-bolt 21 situated intermediate the end of a bearing bracket 22, one end of which extends beneath the spring 10 in engagement therewith and the opposite end of which projects beyond the spring 10 and has a seat 23 for the lower end of a volute spiral compression spring 24, the upper larger end of which is securely fastened to the frame bar 11.

Adjacent to its end bolt 18, the leaf spring 10 is also provided with an upwardly facing spring seat 25 engaged by the lower end of a second volute spiral compression spring 26 whose upper larger end is securely fastened to the frame bar 11.

Thus, by virtue of the toggle levers 14 and 15 whose outward flexing is assisted by the spring 20, the respective end of the usual leaf spring 10 is given a much greater range of movement than at present, and this augmented range of movement is controlled by the springs 24 and 26 capable of taking up the shocks of inequalities in the road bed. It is obvious, however, that while capable of performing their functions in an effective, efficient manner, these additional springs 24 and 26 operate without destroying or impairing the ability and normal purpose of the leaf spring 10 to act as occasion arises.

Referring now to Fig. 3, I have shown the invention as applied to a vehicle frame not using the ordinary leaf spring, in which case I preferably provide an elongated rigid metal bar 28 pivotally connected at one end to a bracket 29 rigidly connected to the frame bar 11ª, and securely clamped at adjacent to its opposite end, to the axle 19ª, in connection with a support 25ª in the lower end of the volute spiral compression spring 26ª, the upper end of which bears against the frame bar 11ª in the same manner as previously described. The extremity of the bar 28 projecting slightly beyond the axle 19ª is connected by toggle levers 14ª and 15ª to a bracket 13ª also secured to the frame bar 11ª, so that in this way it is obvious I am enabled to apply the invention either with or without the usual leaf spring as illustrated in Figs. 1 and 2.

Claims:

1. The combination with a leaf spring, of toggle levers yieldingly supporting one end thereof, and means for controlling yielding movement of said end of the spring including a bearing bracket connected to, and projecting beyond, the spring end, and a volute spiral compression spring engaging the said bracket beyond the leaf spring.

2. The combination with a leaf spring, of means yieldingly supporting one end thereof, and means for controlling yielding movement of said end of the spring including a bearing bracket connected to, and projecting beyond, the spring end, and a volute spiral compression spring at opposite sides of the said end of the leaf spring, one of which engages the leaf spring and the other of which engages said bracket.

3. The combination with a main leaf spring, of levers flexibly supporting the same at one end, coil springs at opposite sides of said levers, one of which directly engages the main spring, and a bracket connected to the main spring and engaged by the other coil spring.

4. The combination with a main leaf spring, levers connected to one end thereof, a volute spiral compression spring having bearing on the leaf spring adjacent to its said end, a bracket intermediately connected to the leaf spring adjacent to the said end, said bracket having a portion underlying the said spring and projecting at one end beyond the spring, and a volute spiral compression spring having bearing on the last mentioned end of the bracket, as described.

5. The combination with a vehicle frame and leaf spring directly connected to the frame at one end, of a pair of plates secured to and depending from the frame, an H-shaped lever pivotally connected to, and depending from, the said plates, a U-shaped lever pivotally connected at its upper end to said first lever and similarly connected at its lower end to the other end of the leaf spring, a spring coiled around the pivot between said levers and engaging the levers at its opposite ends, a bracket connected intermediate its ends to the leaf spring adjacent to the lower lever and having a portion at one end underlying the said spring, and volute spiral compression springs having their lower, smaller ends bearing on the leaf spring and bracket at opposite sides of said levers.

6. The combination with a vehicle frame, an axle, and a flexible-supporting member clamped intermediate its ends to said axle and pivotally connected at one end to said frame, of toggle levers flexibly connecting an opposite end of said flexible-supporting member with the frame, and a volute spiral compression spring disposed between the frame and said spring supporting member adjacent its flexibly connected end.

PETER DU FORD.